(12) United States Patent
Schmalbach et al.

(10) Patent No.: US 7,896,306 B2
(45) Date of Patent: Mar. 1, 2011

(54) CLAMP DEVICE FOR PORTABLE POROUS PAVEMENT SYSTEM

(75) Inventors: Ricardo Schmalbach, Quito (EC); Mario Moreno, Quito (EC); Daniel F. Senf, Appleton, WI (US); Gary M. Bach, Appleton, WI (US)

(73) Assignee: Reynolds Consumer Products, Inc., Richmond, VA (US)

( * ) Notice: Subject to any disclaimer, the term of this patent is extended or adjusted under 35 U.S.C. 154(b) by 518 days.

(21) Appl. No.: 12/017,851

(22) Filed: Jan. 22, 2008

(65) Prior Publication Data

US 2008/0175663 A1    Jul. 24, 2008

Related U.S. Application Data

(60) Provisional application No. 60/886,456, filed on Jan. 24, 2007.

(51) Int. Cl.
*A47B 97/00* (2006.01)
(52) U.S. Cl. .................. 248/505; 248/680; 248/500
(58) Field of Classification Search .............. 248/680, 248/500, 505, 62, 74.4; 405/302.6, 302.7
See application file for complete search history.

(56) References Cited

U.S. PATENT DOCUMENTS

| | | |
|---|---|---|
| 294,240 A | 2/1884 | Judd |
| 512,579 A | 1/1894 | Flannery |
| 1,144,143 A | 6/1915 | McGillivray |
| 1,455,636 A | 5/1923 | McConnal |
| 1,724,843 A | 8/1929 | Kuhn |
| 1,725,239 A | 8/1929 | Williams et al. |
| 1,774,867 A | 9/1930 | Booth |
| 1,905,176 A | 4/1933 | Kieckhefer |
| 2,315,351 A | 3/1943 | Schaefer |
| 2,329,670 A | 9/1943 | Sanchez |
| 2,721,369 A | 10/1955 | Burke |
| 2,727,220 A * | 12/1955 | Buchanan et al. ............ 439/812 |

(Continued)

FOREIGN PATENT DOCUMENTS

DE    31 32 038 A1    3/1983

(Continued)

OTHER PUBLICATIONS

International Search Report, mailed Jun. 27, 2008.

(Continued)

*Primary Examiner* — Terrell Mckinnon
*Assistant Examiner* — Michael McDuffie
(74) *Attorney, Agent, or Firm* — Merchant & Gould P.C.

(57) ABSTRACT

A clamping device for a portable porous pavement system includes a first bracket and a second bracket. The first bracket includes a U-shaped section extending between first and second wings; a first slot defined by the first wing; and a second slot defined by the second wing. The second bracket includes a C-shaped member having first and second arms with a base member joining the first and second arms; a first twistable section defined by the first arm; and a second twistable section defined by the second arm. The first arm is sized to fit through the first slot of the first wing such that the first twistable section and the base member are on opposite sides of the first wing; and the second arm is sized to fit through the second slot of the second wing such that the second twistable section and the base member being on opposite sides of the second wing.

8 Claims, 9 Drawing Sheets

U.S. PATENT DOCUMENTS

| | | | |
|---|---|---|---|
| 2,809,067 A | | 10/1957 | Macchi |
| 3,051,424 A | * | 8/1962 | Duhamel .................... 248/62 |
| 3,209,426 A | * | 10/1965 | Vlasak et al. ................. 24/277 |
| 3,215,873 A | * | 11/1965 | Kruger et al. ............. 310/68 R |
| 3,269,125 A | | 8/1966 | Moore |
| 3,506,531 A | | 4/1970 | Stander |
| 3,561,219 A | | 2/1971 | Nishizawa et al. |
| 3,699,686 A | | 10/1972 | De Winter |
| 3,897,712 A | | 8/1975 | Black |
| 3,934,802 A | | 1/1976 | Jennings |
| 3,954,377 A | | 5/1976 | Scholz et al. |
| 3,990,247 A | | 11/1976 | Palmer |
| 4,020,531 A | * | 5/1977 | Ahrens et al. ................. 24/284 |
| 4,027,408 A | | 6/1977 | Ramella et al. |
| 4,033,139 A | | 7/1977 | Frederick |
| 4,192,383 A | | 3/1980 | Kirkland et al. |
| 4,202,378 A | | 5/1980 | Bush et al. |
| 4,407,050 A | * | 10/1983 | Offterdinger ................. 24/277 |
| 4,411,557 A | | 10/1983 | Booth |
| 4,448,569 A | | 5/1984 | Hackman et al. |
| 4,449,847 A | | 5/1984 | Scales et al. |
| 4,460,291 A | | 7/1984 | Lamendour |
| 4,469,756 A | | 9/1984 | Jungwirth et al. |
| 4,502,815 A | | 3/1985 | Scales et al. |
| 4,530,622 A | | 7/1985 | Mercer |
| 4,572,705 A | | 2/1986 | Vignon et al. |
| 4,575,038 A | * | 3/1986 | Moore ........................ 248/505 |
| 4,619,560 A | | 10/1986 | Crinnion et al. |
| 4,647,325 A | | 3/1987 | Bach |
| 4,648,224 A | | 3/1987 | Kitta et al. |
| 4,675,060 A | | 6/1987 | Schnebly et al. |
| 4,717,283 A | | 1/1988 | Bach |
| 4,728,227 A | | 3/1988 | Wilson et al. |
| 4,778,309 A | | 10/1988 | Bach et al. |
| 4,798,364 A | | 1/1989 | Scott |
| 4,798,498 A | | 1/1989 | Hallberg |
| 4,804,293 A | | 2/1989 | Várkoni et al. |
| 4,832,557 A | | 5/1989 | Jacobsen |
| 4,837,387 A | | 6/1989 | van de Pol |
| 4,856,939 A | | 8/1989 | Hilfiker |
| 4,904,121 A | | 2/1990 | Hallberg |
| 4,965,097 A | | 10/1990 | Bach |
| 5,037,688 A | | 8/1991 | Uchida |
| 5,091,247 A | | 2/1992 | Willibey et al. |
| 5,252,016 A | | 10/1993 | Schmid et al. |
| 5,449,543 A | | 9/1995 | Bach et al. |
| 5,927,906 A | | 7/1999 | Bach et al. |
| 6,131,859 A | * | 10/2000 | Giuliano ...................... 248/62 |
| 6,296,924 B1 | | 10/2001 | Bach |
| 6,308,384 B1 | * | 10/2001 | Normal et al. ................. 24/277 |
| 6,395,372 B1 | | 5/2002 | Bach |
| 6,484,473 B1 | | 11/2002 | Hall |
| 6,532,707 B1 | | 3/2003 | Cannon |
| 6,554,545 B1 | | 4/2003 | Hall |
| 6,779,297 B2 | | 8/2004 | Conde |
| 2008/0251651 A1 | * | 10/2008 | Jackson et al. ................. 248/62 |

FOREIGN PATENT DOCUMENTS

| | | |
|---|---|---|
| DE | 38 16 271 A1 | 12/1988 |
| EP | 0 239 237 A2 | 9/1987 |
| EP | 0 378 309 A1 | 7/1990 |
| FR | 2 299 462 | 3/1978 |
| FR | 2 703 377 | 3/1993 |
| GB | 1 058 611 | 5/1967 |
| GB | 1 379 147 | 1/1975 |
| GB | 1 525 173 | 9/1978 |
| GB | 1 582 284 | 1/1981 |
| GB | 2 078 833 A | 1/1982 |
| JP | 56-16730 | 2/1981 |
| JP | 57-3923 | 1/1982 |
| JP | 57-146835 | 9/1982 |
| JP | 58-101932 | 6/1983 |
| JP | 58-106020 | 6/1983 |
| JP | 63-151712 | 6/1983 |
| JP | 58-131228 | 8/1983 |
| JP | 30/4829 | 12/1988 |
| JP | 64-56326 | 3/1989 |
| JP | 6-192218 | 7/1994 |
| JP | 10 121717 | 5/1998 |
| SU | 1715983 A1 | 2/1992 |

OTHER PUBLICATIONS

US 5,336,544, 08/1994, Bach et al. (withdrawn)

* cited by examiner

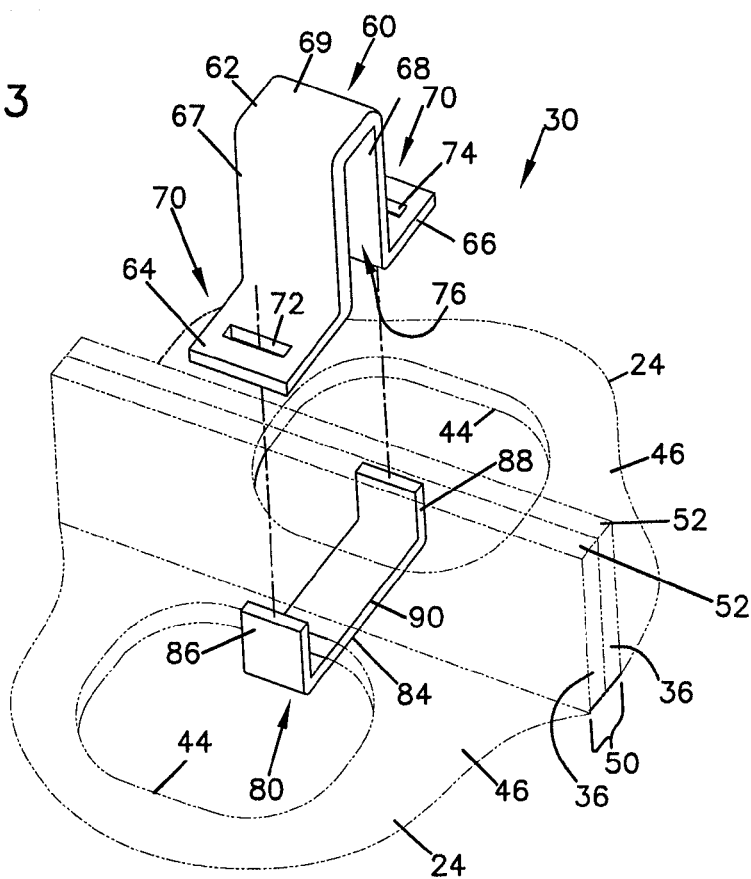
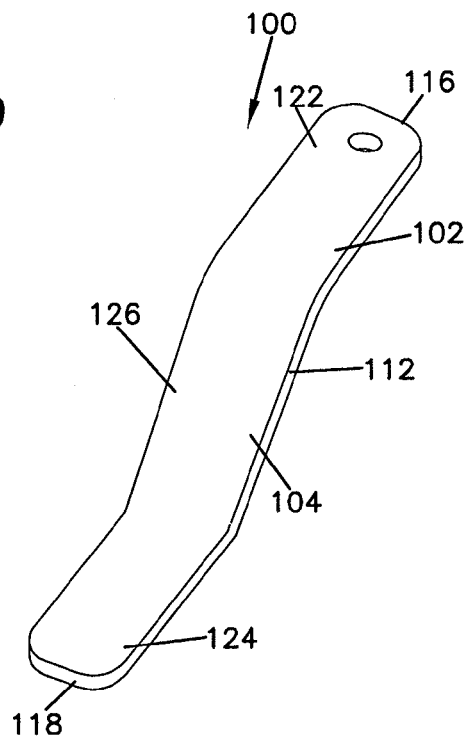

CLAMP DEVICE FOR PORTABLE POROUS PAVEMENT SYSTEM

This application claims priority under 35 U.S.C. §119(e) to U.S. provisional patent application 60/886,456 filed Jan. 24, 2007, which application is incorporated herein by reference in its entirety.

TECHNICAL FIELD

This disclosure relates to porous pavement system components. In particular, it concerns a clamping device for use with a plurality of porous pavement units.

BACKGROUND

The need for an effective soil strength improvement system capable of taking heavy loads and stabilizing poor soils has existed for many years. In certain applications, for example, during petroleum exploration, heavy equipment and materials need to be transported in remote areas that do not necessarily have roads or good supportable soil. Some solutions used in the past have used wood planks to support the loads in areas where the ground is of bad quality. The wood planks need to be stabilized and/or connected together, and it has been found that this is a time-intensive and laborious process. When the work activity is completed, it can be a time-intensive process to disassemble and remove any materials that are not biodegradable, such as nails or other metal stakes. Improved methods for quickly installing and removing these types of pavement systems are desirable.

The assignee, Reynolds Consumer Products, Inc. d/b/a Presto Products of Appleton, Wis., has produced a product sold under the tradename GEOBLOCK®. The GEOBLOCK® porous pavement system provides vehicular and pedestrian load support over grass areas while protecting the grass from the harmful effects of traffic. The unit is made from polyethylene, usually recycled polyethylene. Each unit includes intersecting walls defining a plurality of cells. These units are typically transported to the region where they will be installed. The units are assembled and connected together. Once installed, heavy equipment can be driven over them, and the soil or ground is not damaged and subject to unnecessary erosion or depletion. Improvements in assembly and disassembly are desirable.

SUMMARY OF THE DISCLOSURE

A clamping device for a portable porous pavement system includes a first bracket and a second bracket. The first bracket includes a U-shaped section extending between first and second wings; a first slot defined by the first wing; and a second slot defined by the second wing. The second bracket includes a C-shaped member having first and second arms with a base member joining the first and second arms; a first twistable section defined by the first arm; and a second twistable section defined by the second arm. The first arm is sized to fit through the first slot of the first wing such that the first twistable section and the base member are on opposite sides of the first wing; and the second arm is sized to fit through the second slot of the second wing such that the second twistable section and the base member being on opposite sides of the second wing.

BRIEF DESCRIPTION OF THE DRAWINGS

FIG. 3 is a schematic, exploded, perspective view of a clamping device connecting together two porous pavement units;

FIG. 9 is a perspective view of a lifting lever used to install the porous pavement system of FIG. 1;

DETAILED DESCRIPTION

Figure 1:
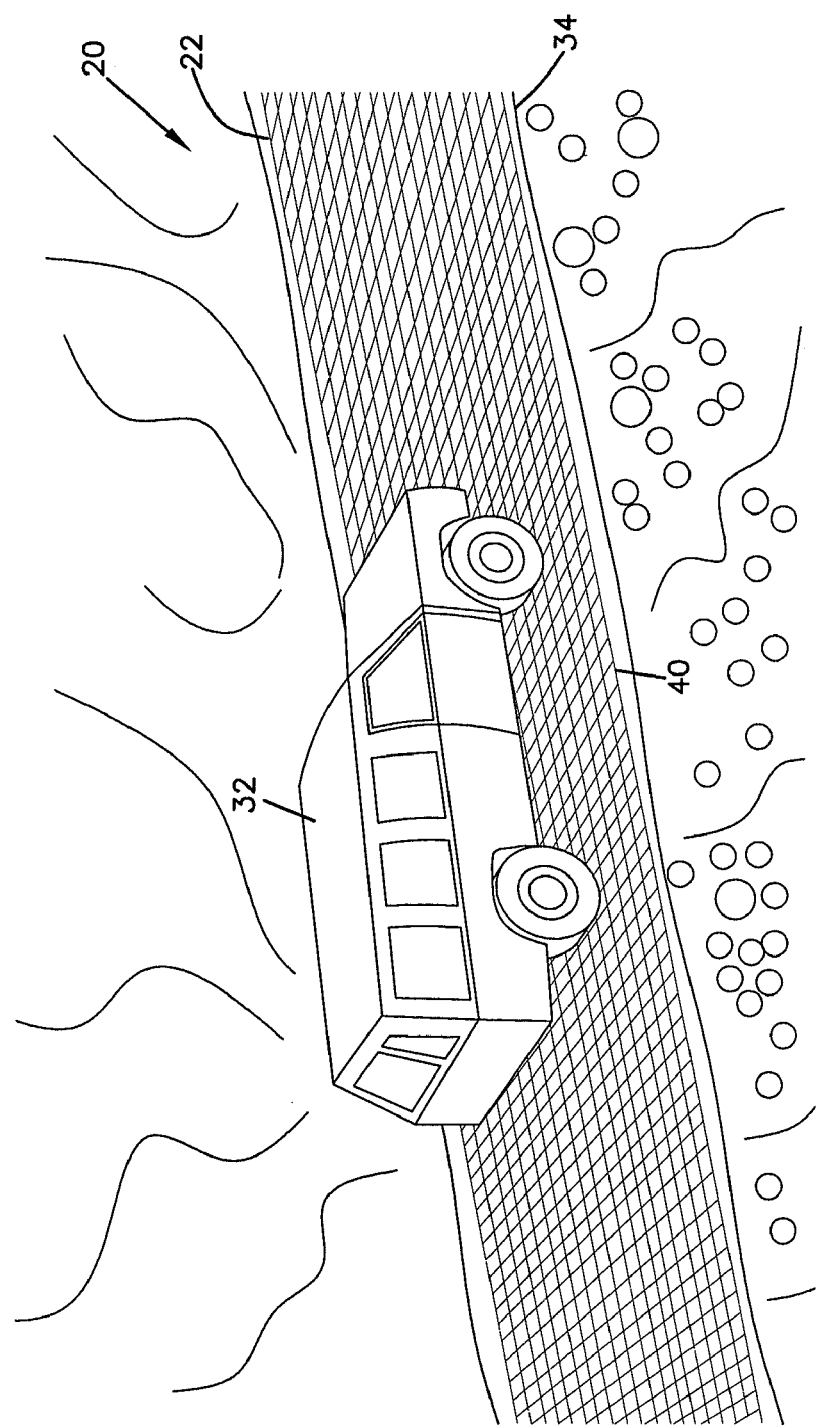
FIG. 1 is a schematic illustration of a portable porous pavement system installed and in use.

FIG. 1 illustrates a portable porous pavement system 20. The system 20 includes a grid 22 made from a plurality of individual porous pavement units 24 (FIG. 2) secured or connected together by a plurality of clamping devices 30 (FIG. 3). In FIG. 1, a truck 32 is illustrated driving on the grid 22. The grid 22 is oriented on a surface 34, which will typically be ground or soil. In many typical applications, it will be desirable to transport heavy equipment into an area that does not have roads or stable soil. In such applications, a plurality of the porous pavement units 24 are assembled into the grid 22 and secured together by the clamping devices 30. In such systems, the grid 22 is quickly and easily assembled and is able to be quickly and easily disassembled.

Figure 2:
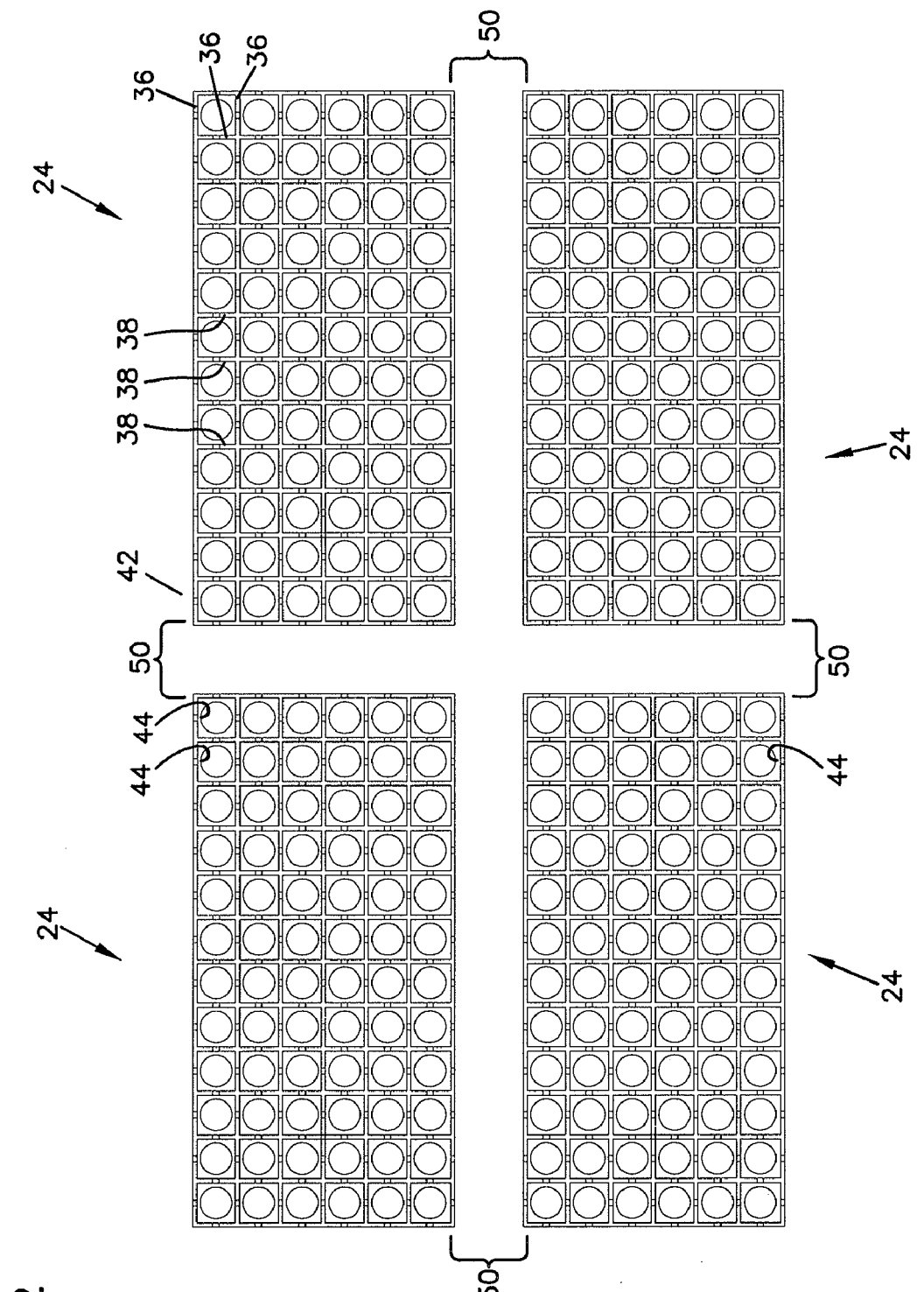
FIG. 2 is a top plan view of a plurality of individual porous pavement units, which are connected together and comprise the grid system illustrated in FIG. 1.

FIG. 2 shows typical porous pavement units 24 usable in the system 20. The porous pavement units 24 are portable in that they are of a size that can be easily stacked onto pallets and moved. In the example shown, each porous pavement unit is approximately 1.0 m×0.5 m, although other sizes are usable. Each of the porous pavement units 24 has a depth of at least 25 mm, typically 50 mm, and a nominal coverage area of at least 0.25 m² and typically 0.5 m². As can be seen in FIG. 2, each of the porous pavement units 24 is made of a matrix or grid of intersecting walls 36. The intersecting walls 36 define a plurality of cells 38.

Figure 4:
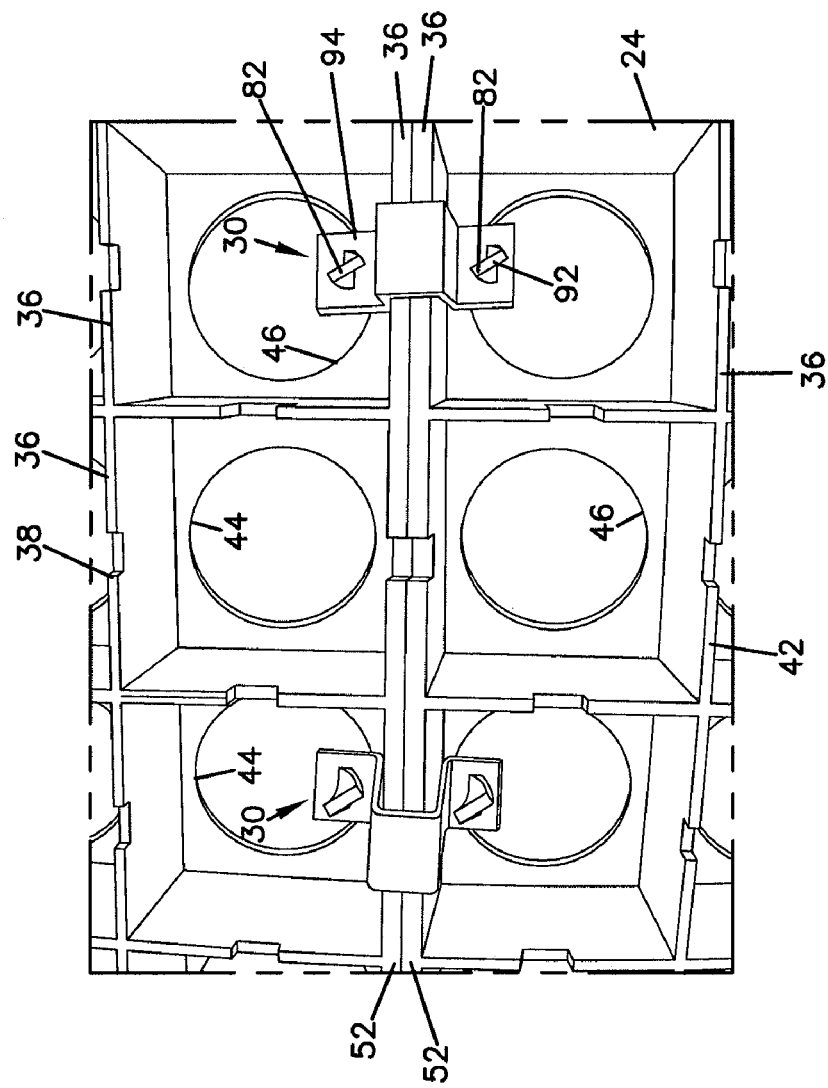
FIG. 4 is a perspective view of a portion of two porous pavement units connected together with a pair of clamping devices.

Each of the porous pavement units 24 has a mounting side 40 and an opposite user side 42. The mounting side 40 is the side that is in contact with the ground surface 34. The user side 42 is the side that is open to the surrounding environment and is the side that is exposed to the heavy equipment, such as truck 32 (FIG. 1). In FIG. 2, the user side 42 is the side that is in view. Further, FIG. 4 shows portions of two porous pavement units 24 with the user side 42 in view.

Each of the cells 38 defined by the walls 36 has an aperture 44 (FIGS. 2 and 4), which is depicted as circular. The apertures 44 are defined by a planar wall 46. An opposite side of the planar wall 46 is the mounting side 40. Extending perpendicular from the planar wall 46 are the walls 36. The walls 36 form rectangles, in the embodiment shown, squares in which free ends 52 (FIG. 3) define and form the user side 42.

Each of the porous pavement units 24, in typical embodiments, will have at least 30 cells 38, typically 70-80 cells. Each porous pavement unit 24 is made from a non-metal material, for example, up to 100% recycled polyethylene has been found to be useful. Such a material will result in porous pavement unit 24 as having a weight of not greater than 10 kg, typically 4-5 kg. Each porous pavement unit will have a crush strength of at least 2500 kPa and flexural modulus of 200,000-300,000 kPa. Typical implementations will include the material for the porous pavement unit 24 as having a crush strength of at least 2900 kPa and flexural modulus of 220,000-260,000 kPa. Each cell 38 has a size of about 60-100 mm×60-100 mm, typically, about 78-82×78-82 mm. The open area of the user side 42 is at least 60%, typically 85-95%, and in one application, about 87%. The bottom open area is at least 25%, typically 30-50%, and in one application about 40%.

In FIG. 2, four porous pavement units 24 are shown. These porous pavement units 24 are secured together at joints 50 using the clamping devices 30. FIG. 4 illustrates two of the porous pavement units 24 secured together at two adjacent walls 36 with two clamping devices. In FIG. 3, the clamping device 30 is shown in an exploded view during a step of connecting together two adjacent porous pavement units 24.

In general, each clamping device 30 will include a first bracket and a second bracket that fit together in order to secure the two adjacent porous pavement units 24 together at joints 50. As embodied herein, a first bracket is shown at 60, and a second bracket is shown at 80.

Figure 5:
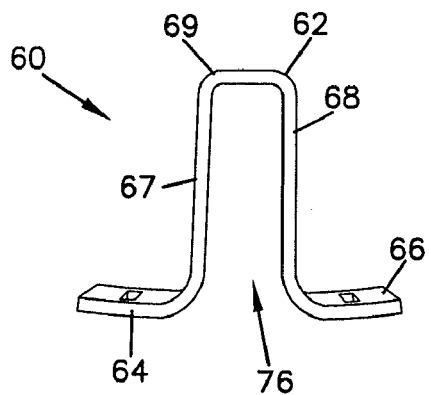
FIG. 5 is a side-elevation view of a first bracket of the clamping device.
Figure 7:
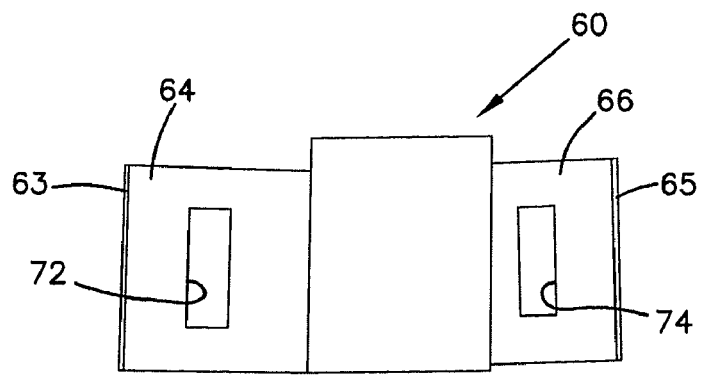
FIG. 7 is a top plan view of the first bracket used in the clamping device.

In reference now to FIGS. 3, 5, and 7, the particular embodiment of first bracket 60 illustrated in the drawings includes a U-shaped section 62 extending between first and second wings 64, 66. As can be seen in the drawings, the first and second wings 64, 66 are generally flat extensions projecting from the open end of the U-shaped section 62. The first bracket 60 further includes a slot arrangement 70. In the embodiment shown, the slot arrangement 70 comprises a first slot 72 defined by the first wing 64 and a second slot 74 defined by the second wing 76.

Attention is directed to FIG. 7. Each of the first and second slots 72, 74 has an aspect ratio of length to width of a particular range. The aspect ratio selected is a ratio that will allow the first bracket 60 to engage the second bracket 80 in such a way that is easy and quick to assemble and then be easily and quickly secured together. In general, it has been found that the aspect ratio of length to width for each of the first and second slots 72, 74 should be greater than 1. In many useful applications, the aspect ratio of length to width will be in the range of 2-5, and in the particular embodiment illustrated, the aspect ratio used will be 3-4, for example, about 3.25.

In the embodiment shown in FIG. 7, each of the first and second slots 72, 74 is rectangular having a greater length than width. In other embodiments, the first and second slots 72, 74 can be non-rectangular, including a regular or irregular polygon, oval, ellipse, or irregular shape. For any of these shapes, it is useful to have an aspect ratio that is greater than 1, in which the aspect ratio would be the shortest length compared to the greatest width compared to the useful part of the slot. In FIG. 7, each of the slots 72, 74 has a length illustrated as 13 mm and a width illustrated as 4 mm.

Referring now to FIG. 5, other details of the first bracket 60 are shown. The U-shaped section 62 includes first and second legs 67, 68 joined by a connecting section 69. The inner dimension between the first and second legs 67, 68 in the embodiment shown is 15 mm, while the length of the connecting section 69 is illustrated as 20 mm. The connecting section 69 is generally parallel to the first and second wings 64, 66. As can be seen, the first and second wings 64, 66 each have a length of about 20 mm. The height of the first and second legs 67, 68 is about 45 mm. In FIG. 7, it can be seen that the overall length from free end 63 of the first wing 64 and free end 65 of wing 66 is about 59 mm. The overall width of the first bracket 60, in the embodiment shown, is about 25 mm.

It should be understood that while these dimensions are typical, usable dimensions, embodiments of the first bracket 60 can be modified in a variety of dimensions depending upon the particular design goals, materials used, and other factors.

Figure 6:
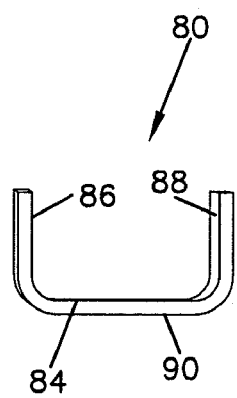
FIG. 6 is a side-elevation view of a second bracket of the clamping device.
Figure 8:
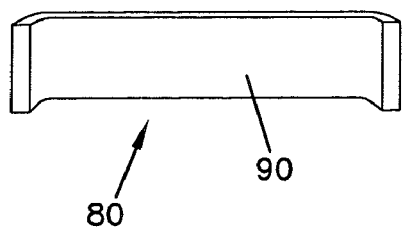
FIG. 8 is a top plan view of the second bracket used in the clamping device.

In reference now to FIGS. 3, 6, and 8, further details of the second bracket 80 are illustrated. In the embodiment shown, the second bracket 80 engages the first bracket 60 such that it is in intimate communication with the slot arrangement 70 of the first bracket 60. The second bracket 80 further includes a twisted arrangement 82 (FIG. 4) to secure the second bracket 80 and the first bracket 60 together. In FIGS. 3 and 4, it can be seen how two adjacent walls 36 of two adjacent porous pavement units 24 are sandwiched between the first bracket 60 and the second bracket 80 to secure the two adjacent porous pavement units 24 together.

In the embodiment shown, the second bracket 80 of each clamping device 30 includes a C-shaped member 84 defined by first and second generally parallel arms 86, 88 with a base member 90 joining the first and second arms 86, 88. In the embodiment shown in FIG. 6, usable dimensions are illustrated. Again, these dimensions are examples only and a variety of dimensions are usable. In the embodiment shown, the base member 90 has an inside length between the first and second arms 86, 88 of 37 mm, and an outside length including the first and second arms 86, 88 of about 43 mm. Each of the first and second arms 86, 88 has a height of about 25 mm and a width of about 11 mm.

The shape of the first and second arms 86, 88 is selected to be of a size and shape such that they can be received by the slots 72, 74. As such, the general cross-sectional shape of each of the arms 86, 88 will have an aspect ratio that is compatible with the aspect ratio of the slots 72, 74. This is explained further below.

Figure 12:
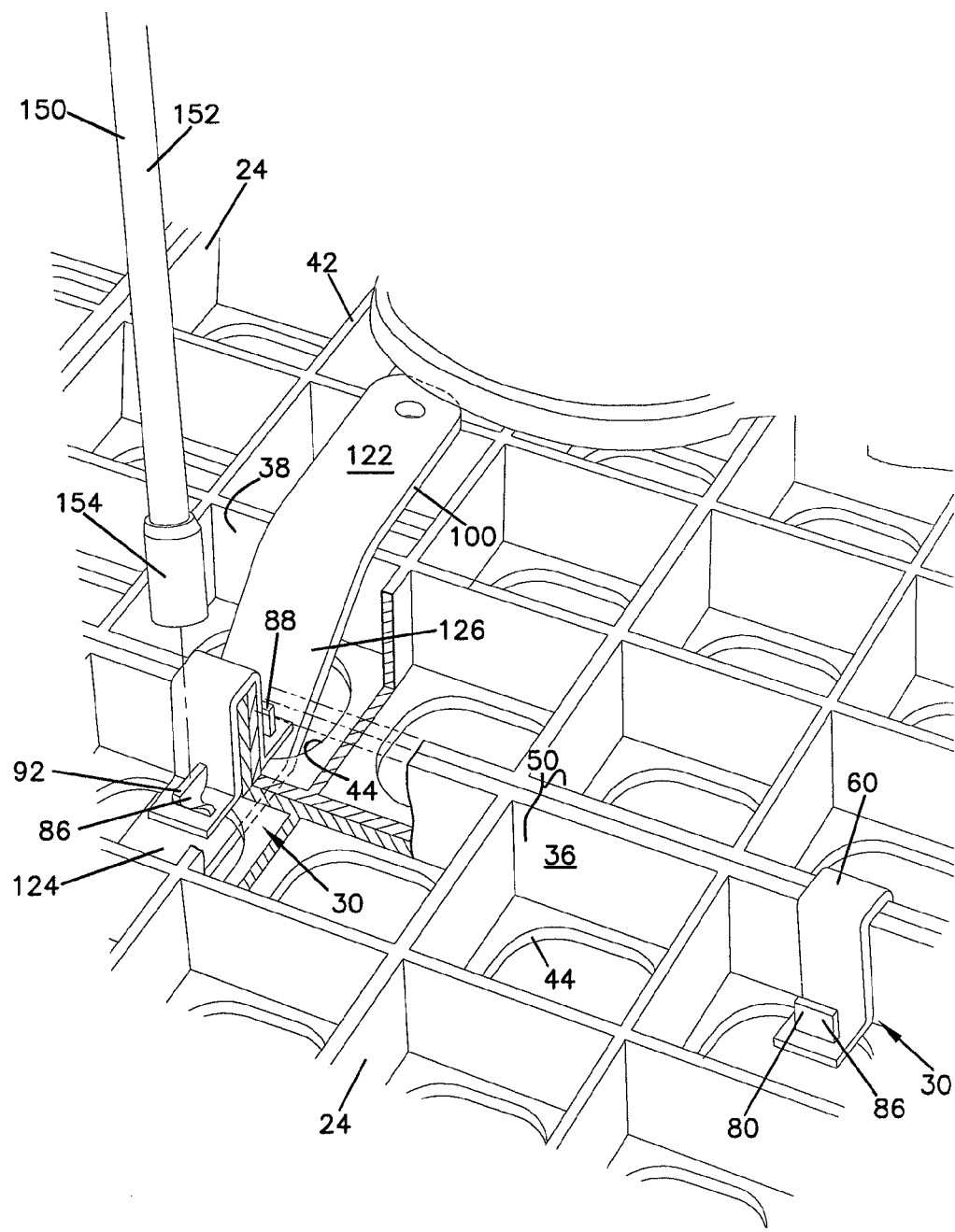
FIG. 12 is an enlarged perspective view of the system shown in FIG. 11, after one of the arms of the second bracket is twisted by the torsion wrench.

The twisted arrangement 82 includes a first twisted section 92 defined by the first arm 86 and a second twisted section 94 defined by the second arm 88 (FIGS. 4 and 12, with FIG. 12 showing first twisted section 92 only). By comparing FIGS. 3, 4, and 12, it should be appreciated that in use, the first arm 86 extends through the first slot 72 of the first wing 64, with the first twisted section 92 and the base member 90 of the C-shaped member 84 being on opposite sides of the first wing 64. The second arm 88 extends through the second slot 74 of the second wing 66, with the second twisted section 94 and the base member 90 of the C-shaped member being on opposite sides of the second wing 66. As such, the first and second twisted sections 92, 94 lock the second bracket 80 to the first bracket 60, with the walls 36 of the porous pavement units 24 trapped therebetween.

Therefore, it should be appreciated that the relationship of the geometry of the cross-section of the first and second arms 86, 88 relative to the geometry of the first and second slots 72, 74 results in the first and second arms 86, 88 being able to be twisted in a way that will prevent the first and second arms 86, 88 from backing out of the first and second slots 72, 74 and, thus, locking the second bracket 80 to the first bracket 60. In the embodiment shown, the cross-sectional shape of the first arm 86 and second arm 88 is rectangular having a width less than 4 mm, for example, in the embodiment shown, 2 mm, and a length less than 13 mm, for example, in the embodiment shown 11 mm. This gives the first and second arms 86, 88 a cross-section having an aspect ratio of length to width of greater than 1, for example, 3-8, and in the embodiment shown, 5.5.

While a variety of materials are useful, it has been found useful for the first and second brackets 60, 80 to be made of a strong, durable, tough material such as steel. Other materials can be used.

To assemble the system 20, there will typically be several clamping devices 30 utilized, including at least one, and typically more than one clamping device 30 to secure together two adjacent porous pavement units 24. In FIG. 3, it can be seen how the second bracket 80 is arranged against the ground or surface 34 (FIG. 1) and facing and against the mounting side 40 of the porous pavement units 24. Thus, the base member 90 of each of the second brackets 80 is between the mounting side 40 of the porous pavement units 24 and the ground 34. Two adjacent walls 36 are lined up adjacent to each other as shown schematically by joints 50 in FIG. 2 and in FIG. 3 showing walls 36 back to back and adjacent to each other. The second bracket 80 is oriented such that the base member 90 bridges the joint 50 extending under the two adjacent walls 36, with the first and second arms 86, 88 pointing upwardly away from the ground surface 34 toward the user side 42 and, in the embodiment shown, through the apertures 44. The first bracket 60 is oriented such that the U-shaped section 62 defines a closed slot 76 defined by the first leg 67, second leg 68, and connecting section 69. The closed slot 76 extends over and receives the joint 50 comprising the back to back walls 36 of the two adjacent porous pavement units 24. The free ends 52 of the walls 36 are the ends that define the user side 42. These free ends 52 will also be facing the closed portion of the closed slot 76 defined by the connecting section 69, when the first bracket 60 is operably oriented over the joint 50.

Figure 10:
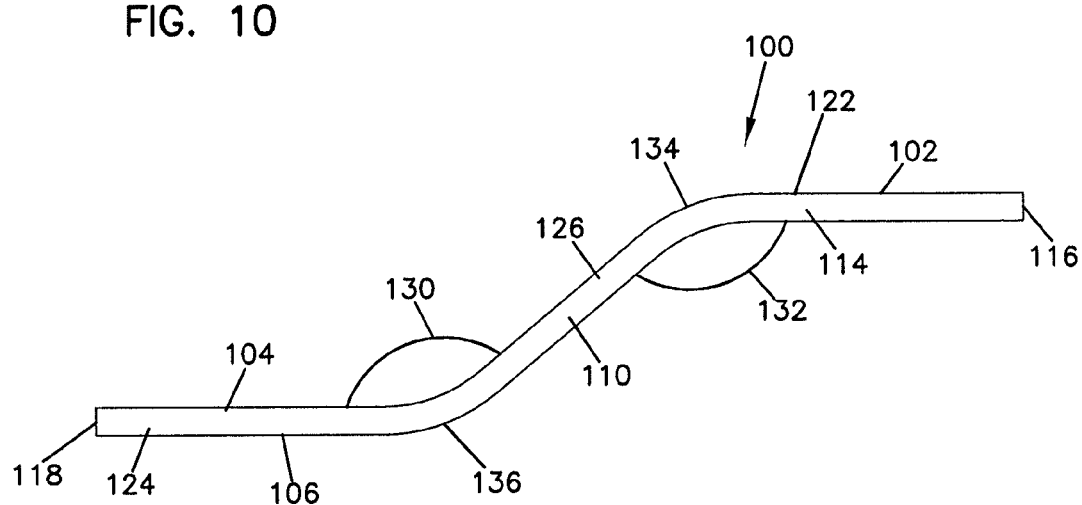
FIG. 10 is a side-elevation view of the lifting lever of FIG. 9.

To facilitate quick assembly and disassembly of the system 20, tools are useful. FIGS. 9 and 10 illustrate a lifting lever 100. Particular preferred techniques for using the lifting lever 100 are described below in connection with methods for assembly of the system 20. FIG. 9 shows the lifting lever 100 in perspective view, while FIG. 10 shows the lifting lever 100 in a side elevation view. In general, the lifting lever 100 includes an extension 102 having first and second opposite surfaces 104, 106. The first and second surfaces 104, 106 have, in the embodiment shown, four side walls 110 joining them, including two elongated side walls 112, 114 and two end side walls 116, 118. It should be understood that, in general, the lifting lever 100 is generally symmetrical.

Still in reference to FIGS. 9 and 10, the lifting lever 100 has an overall side profile that resembles a stretched out Z-shape. In particular, the lifting lever 100 includes a first section 122, a second section 124 generally parallel to the first section 122, and a connecting section 126 extending between the first section 122 and second section 124. In the embodiment shown, the connecting section 126 is angled at angle 130 relative to the second section 124 obtusely that is, greater than 90 degrees. Similarly, the connection section 126 is angled relative to the first section 122 at angle 132, which is greater than 90 degrees. In preferred embodiments, the first angle 130 and the second angle 132 are about the same.

In preferred implementations, the first section 122 will have a length between the end side wall 116 and bend 132 (bend 134 is where the connection section 126 begins) that is sufficiently long to support a portion of a human foot. The reasons for this are explained below. A usable length would be at least 40 mm, typically 50-200 mm, for example, about 90-110 mm.

The second section 124 will typically have a length between end side wall 118 and bend 136 (bend 136 is where the connection section 126 begins) that is sufficiently long to extend under and support the second bracket 80. The reasons for this are described below. Typically, this length will be about the same as the length of the first section 122 (although it does not have to be the same), and thus, will be at least 40 mm, typically 50-200 mm, for example about 90-110 mm.

The width of the lifting lever 100 between elongated side wall 112 and elongated side wall 114 will be selected to be narrow enough to fit within the cells 38, and in particular, the apertures 44. Thus, the width will be 25-60 mm wide, for example, 30-50 mm. The overall length of the wrench 100 will typically be at least 200 mm, typically, 220-500 mm, for example 280-320 mm. Methods for use of the wrench 100 are described below. In preferred embodiments, the wrench 100 is made from steel.

Figure 11:
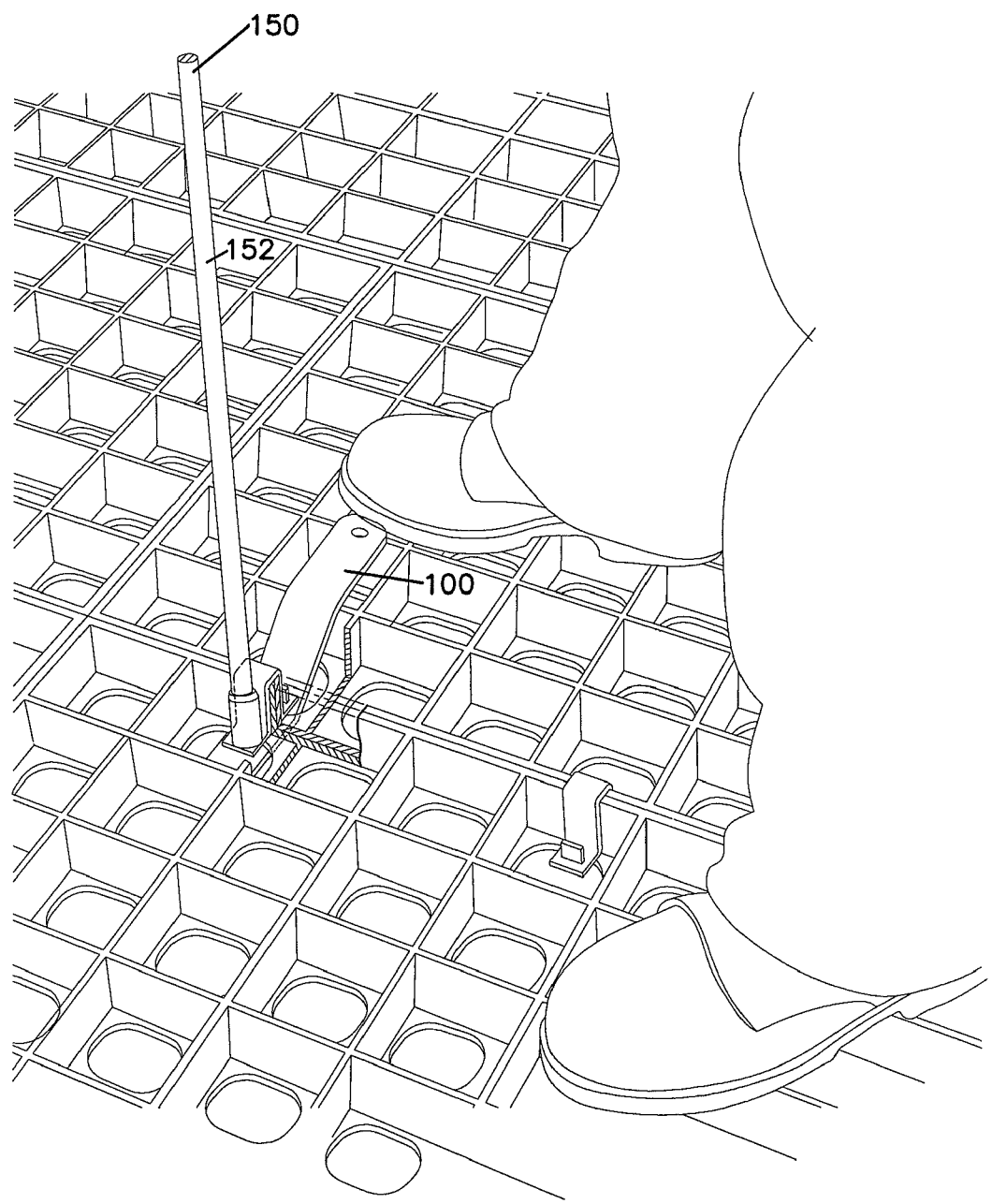
FIG. 11 is a schematic, perspective view of one step of the method of connecting together two porous pavement units using the connector arrangement, lifting lever and a torsion wrench.
Figure 13:
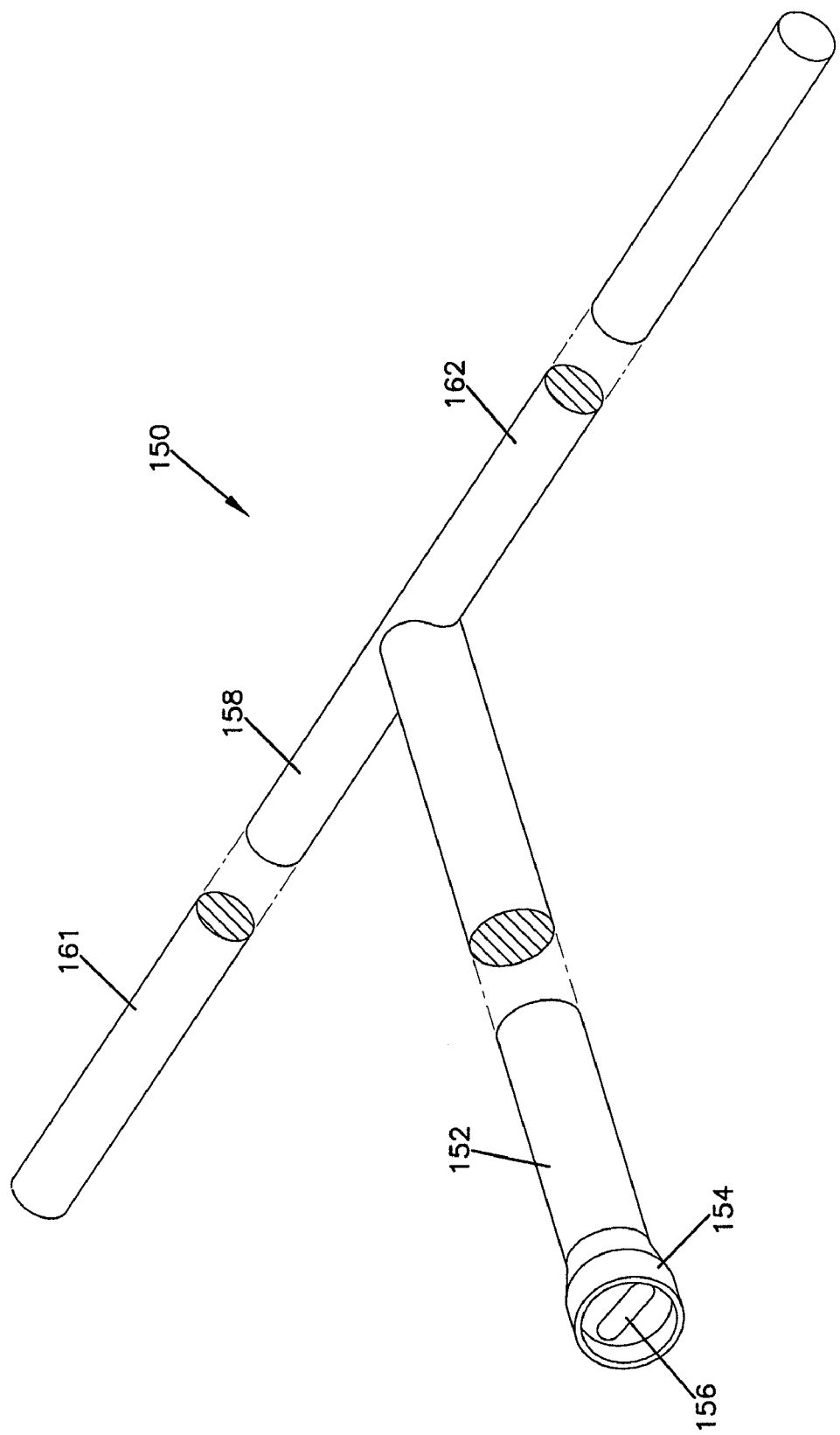
FIG. 13 is a schematic, perspective view of the torsion wrench used in the method of assembly.

A second tool, illustrated as a torsion wrench 150 is shown in FIGS. 11-13, and especially FIG. 13. The torsion wrench 150 includes a neck 152 having a head 154. The head 154 defines a receiving cavity 156 that is shaped with the same cross-sectional shape as the first and second arms 86, 88 and sized to be able to receive, individually, the first and second arms 86, 88. Extending from the neck 152 is a grip bar 158. As can be seen in FIG. 13, the grip bar 158 forms the top of a T-shape, relative to the neck 152.

In the embodiment illustrated, the receiving cavity 156 has a rectangular cross-sectional shape. As mentioned above, the cavity is sized to be able to receive, individually, the ends of the first and second arms 86, 88. In preferred arrangements, the shape of the receiving cavity will have an aspect ratio of length to width that is greater than 1, for example, in the range of 2-5.

In use, each of the free ends of the first and second arms 86, 88 are insertable into the receiving cavity 156 of the head 154. Then, the grip bar 158 can be gripped at opposite sides 161, 162 from the neck 152 and rotated or twisted. In the embodiment illustrated, sides 161, 162 are equal in length. This rotation will translate into a rotational force on the ends of whichever arm 86, 88 is within the receiving cavity 156. Thus, the torsion wrench 150 creates the first twisted section 92 and second twisted section 94 by applying a rotational or torsion force to the first and second arms 86, 88 of the second bracket 80. One usable material for torsion wrench 150 is steel.

The lifting lever 100 is used before the step of twisting by inserting the wrench 100 between the ground surface 34 and the base member 90 of the C-shaped clamp member 84, such that the second section 124 is between the ground surface 134 and the base member 90, with the connection section 126 extending through one of the apertures 44, and the first section 122 is exposed on the user-side 42 of the porous pavement unit 24. FIGS. 11 and 12 show the lifting lever 100 extending through a cell 38 of one of the porous pavement units 24 to the user side 42. After the lifting lever 100 is inserted, the first section 122 is stepped on by a person that is on the user side 42 of the porous pavement units 24. This provides a stability to then allow the torsion wrench 150 to be mounted over one of the arms 86, 88 and apply a twisting force to create one of the twisted sections 92, 94. The lifting lever 100 may then be removed from the cell 88 and used again.

In FIGS. 11 and 12, two clamping devices 30 are visible, with one being shown just after first twisted section 92 has been created by the combination of torsion wrench 150 and lifting lever 100. The other clamping device 30 viewable in FIGS. 11 and 12 shows the first and second brackets 60, 80 engaged, but not locked together with the twisted arrangement 82 in place.

A method of assembling the portable porous pavement system 20 should now be apparent. At least first and second porous pavement units 24 are provided. The C-shaped clamp member 84 is mounted over two adjacent walls 36 of the adjacent porous pavement units 24. The two adjacent walls 36 are between the first and second arms 86, 88 of the C-shaped member 84, and the base member 90 of the C-shaped member 84 is against the mounting side of the porous pavement units 24. The porous pavement units 24 with the C-shaped clamp member 84 is mounted on surface 34, such as soil or ground, with the free ends of the first and second arms 86, 88 pointing away from the ground 34. The mounting sides 40 of the porous pavement units 24 are against the ground surface 34.

Next, the first bracket, including locking bracket having the U-shaped section 62 extending between the first and second wings 64, 66 is mounted over the C-shaped clamp member 84 by orienting the U-shaped section 62 over the two adjacent walls 36, with the first arm 86 going through the first slotted wing 64 and the second arm 88 going through the second slotted wing 66.

Next, the lifting lever 100 is inserted between the ground surface 34 and the base member 90 of the C-shaped clamp member 84, the lifting lever 100 extending from the base member 90 through the cell 38 of the porous pavement unit to the user-side 42. In particular, the section 122 extends under the base member 90 of the second bracket 80, the connection section 126 extends through the aperture 44, and the first section 122 extends over and above the user side 42.

Next, the user steps on the first section 122, which results in an upward force being exhibited on the base member 90 second bracket 80. This helps to stabilize the first and second brackets 60, 80 through the next method step.

The next method step includes using the torsion wrench 150 to twist individually, the first arm 86 and second arm 88 to provide first twisted section 92 and second twisted section 94. In particular, the receiving cavity 156 is fitted over the free end of an individual first arm 86 or second arm 88, and then a rotational force is created by pressing on opposite sides 161, 162 of the grip bar 158. This results in a twisting force to be translated to the neck 152, 154 and then twist the first or second arm 86, 88.

After each of the first and second twisted sections 92, 94 are created, another clamping device can be secured by locking together the first bracket 60 and second bracket 80. The lifting lever 100 can be removed from the cell 38 and used at the next clamping device 30, while the torsion wrench 150 is removed for use at the next clamping device 30.

To disassemble the system 20, the above process is reversed. The twisted sections 92, 94 can be untwisted using the torsion wrench 150 to allow the first bracket 60 and second bracket 80 to be disassembled.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A clamping device for a portable porous pavement system; the clamping device comprising:
    (a) a first bracket including a U-shaped section extending between first and second wings;
        (i) a first slot defined by the first wing; and
        (ii) a second slot defined by the second wing;
    (b) a second bracket including a C-shaped member having first and second arms with a base member joining the first and second arms;
        (i) a first twistable section defined by the first arm; and
        (ii) a second twistable section defined by the second arm;
            (A) the first arm being sized to fit through the first slot of the first wing and such that the first twistable section and the base member are on opposite sides of the first wing; and
            (B) the second arm being sized to fit through the second slot of the second wing and such that the second twistable section and the base member being on opposite sides of the second wing.

2. A clamping device according to claim 1 wherein:
    (a) the first and second slots each has an aspect ratio of length to width that is greater than 1.

3. A clamping device according to claim 1 wherein:
    (a) the first and second slots each has an aspect ratio of length to width that is in a range of 3-4.

4. A clamping device according to claim 1 wherein:
    (a) the first and second arms each has an aspect ratio of length to width that is in a range of 3-8.

5. A clamping device according to claim 1 wherein:
    (a) the first and second slots are each rectangular in shape.

6. A clamping device according to claim 1 wherein:
    (a) the first and second arms each has a rectangular cross-sectional shape.

7. A clamping device according to claim 1 wherein:
    (a) each of the first bracket and second bracket comprises steel.

8. A clamping device according to claim 1 wherein:
    (a) the U-shaped section includes first and second legs joined by a connecting section;
        (i) an inner dimension between the first and second legs being about 15 mm;
        (ii) the first and second wings each having a length of about 20 mm;
        (iii) a height of the first and second legs each being about 45 mm; and
    (b) the base member of the C-shaped member having an inside length of about 37 mm.

* * * * *